US008811941B2

(12) United States Patent
Fuller, Jr. et al.

(10) Patent No.: US 8,811,941 B2
(45) Date of Patent: *Aug. 19, 2014

(54) SYSTEMS AND METHODS FOR PROVIDING UPDATED MOBILE STATION LOCATION ESTIMATES TO EMERGENCY SERVICES PROVIDERS

(71) Applicant: AT&T Mobility II LLC, Atlanta, GA (US)

(72) Inventors: Marvin U. Fuller, Jr., Cumming, GA (US); John P. Davis, III, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/913,637

(22) Filed: Jun. 10, 2013

(65) Prior Publication Data

US 2013/0267195 A1 Oct. 10, 2013

Related U.S. Application Data

(63) Continuation of application No. 13/252,458, filed on Oct. 4, 2011, now Pat. No. 8,483,739, which is a continuation of application No. 12/915,215, filed on Oct. 29, 2010, now Pat. No. 8,078,210, which is a continuation of application No. 11/145,590, filed on Jun. 6, 2005, now Pat. No. 7,848,769.

(51) Int. Cl.
*H04M 11/04* (2006.01)

(52) U.S. Cl.
USPC .... 455/404.2; 455/3.05; 455/421; 455/456.1; 455/521

(58) Field of Classification Search
USPC ................... 455/3.05, 404.2, 421, 456.1, 521
See application file for complete search history.

(56) References Cited

U.S. PATENT DOCUMENTS

| | | | |
|---|---|---|---|
| 5,930,713 A | 7/1999 | Nguyen | |
| 6,088,594 A | 7/2000 | Kingdon et al. | |
| 6,115,599 A | 9/2000 | Stilp | |
| 6,134,447 A | 10/2000 | Havinis et al. | |
| 6,321,092 B1 | 11/2001 | Fitch et al. | |
| 6,334,059 B1 | 12/2001 | Stilp et al. | |
| 6,453,168 B1 | 9/2002 | McCrady et al. | |
| 6,757,545 B2 | 6/2004 | Nowak et al. | |
| 6,952,574 B2 | 10/2005 | Tealdi et al. | |
| 6,985,747 B2 | 1/2006 | Chithambaram | |
| 7,155,201 B2 | 12/2006 | Lugo Saucedo et al. | |
| 7,313,402 B1 | 12/2007 | Rahman | |

(Continued)

*Primary Examiner* — Kwasi Karikari
(74) *Attorney, Agent, or Firm* — Parks IP Law LLC; Mickki D. Murray, Esq.

(57) ABSTRACT

A wireless communication system, including apparatuses and methods, for handling emergency calls from wireless communication devices to emergency services providers and for automatically providing updated location estimates for the wireless communication devices to during such emergency calls absent any request therefor. The updated location estimates are generally provided in response to a detected occurrence of a triggering event within the wireless communication system. In the exemplary embodiments, such triggering events include the passage of a pre-determined threshold period of time and the handover of an emergency call between cells or sectors of the wireless communication system in response to movement of the wireless communication device from which the emergency call is being made. Further, according to at least one exemplary embodiment, the wireless communication system may selectively limit the provision of updated location estimates based on whether movement of a wireless communication device is substantial or insubstantial.

20 Claims, 10 Drawing Sheets

(56) References Cited

U.S. PATENT DOCUMENTS

| | | |
|---|---|---|
| 7,565,131 B2 | 7/2009 | Rollender |
| 2002/0037750 A1* | 3/2002 | Hussain et al. ............... 455/564 |
| 2004/0203885 A1* | 10/2004 | Quaid ........................ 455/456.1 |
| 2004/0266453 A1 | 12/2004 | Maanoja et al. |
| 2005/0043036 A1 | 2/2005 | Ioppe et al. |
| 2005/0096067 A1 | 5/2005 | Martin |
| 2005/0169248 A1 | 8/2005 | Truesdale |
| 2005/0190892 A1 | 9/2005 | Dawson et al. |
| 2006/0062175 A1 | 3/2006 | Ling et al. |

* cited by examiner

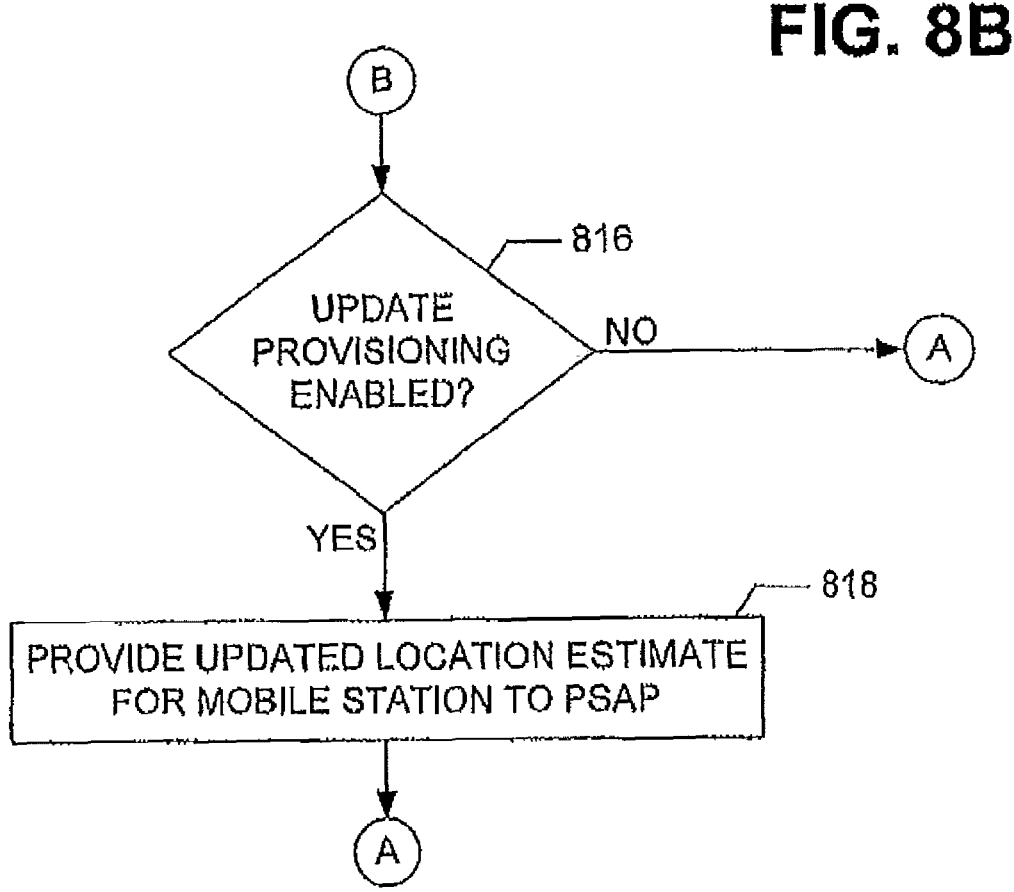

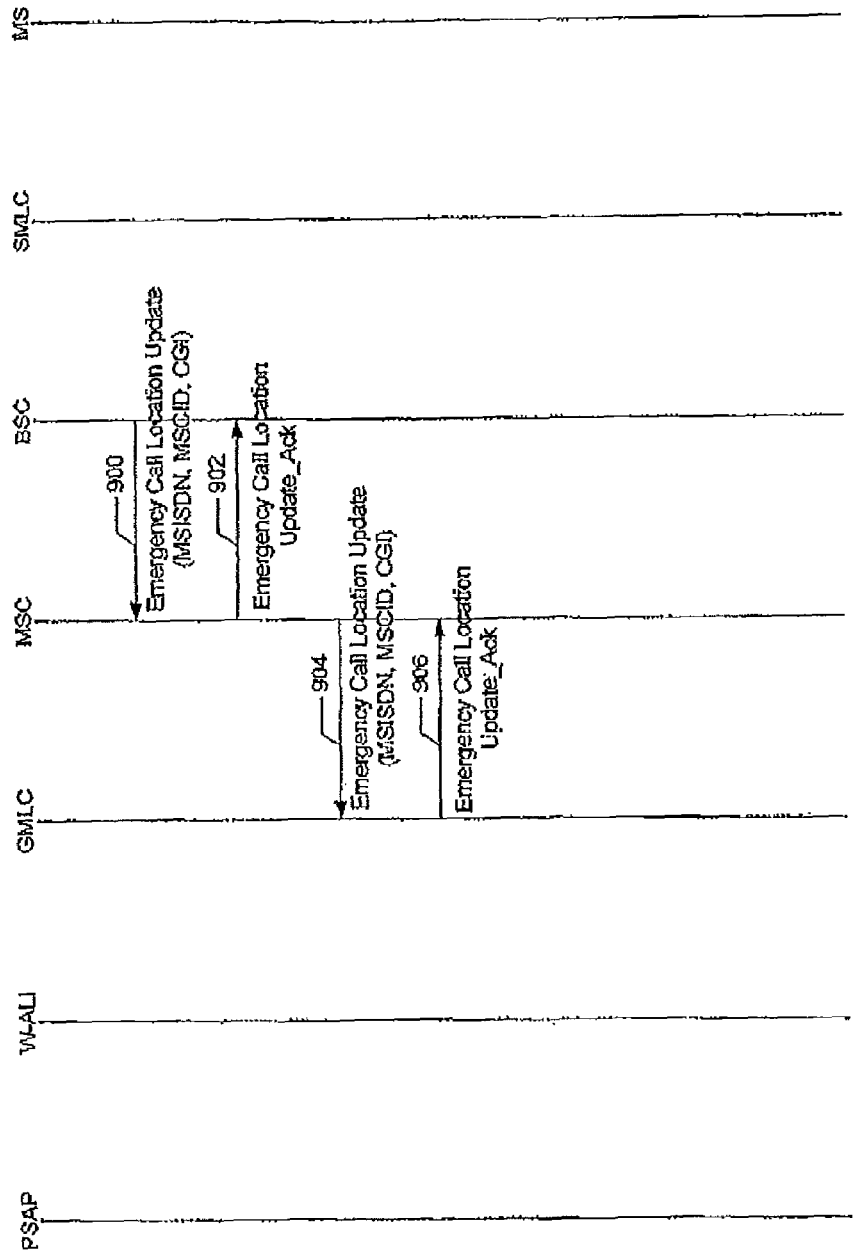

SYSTEMS AND METHODS FOR PROVIDING UPDATED MOBILE STATION LOCATION ESTIMATES TO EMERGENCY SERVICES PROVIDERS

BACKGROUND OF THE INVENTION

1. Field of the Invention

The present invention relates generally to the field of wireless communication systems and more particularly to wireless communication systems and methods for automatically providing updated location estimates for wireless communication devices to emergency services providers during emergency calls.

2. Description of the Related Art

A person desiring emergency services in most areas of North America may place an emergency call to an appropriate emergency services provider (e.g., a governmental public safety organization responsible for the provision of such services) by dialing the digits "911" on a wired or wireless communication device. The emergency call is then routed and connected to a dispatcher located at a public safety answering point of the emergency services provider. Soon after communicating certain basic information to the dispatcher, the person (i.e., the caller) generally receives emergency services from police, fire, or paramedic personnel as appropriate.

When such an emergency call is made by a caller using a wireless communication device, the caller's wireless service provider must also provide certain data to the emergency services provider. The required data is specified by governmental regulations pertaining to the handling of emergency calls originating from a wireless telephone or other wireless communication device. The governmental regulations are commonly referred to as "e911" regulations and currently include two sets, or phases, of regulations. For the wireless service provider's network to be compliant with the first phase of the e911 regulations pertaining to such calls (e.g., the Phase I e911 regulations), the wireless service provider must provide the telephone number of the caller's wireless communication device and the street address of the cell tower providing service to the caller's wireless communication device. Alternatively, for the wireless service provider's network to be compliant with the second phase of the e911 regulations pertaining to such calls (e.g., the Phase II e911 regulations), the wireless service provider must provide the latitude and longitude corresponding to a location estimate for the caller's wireless communication device in addition to the information or data provided in accordance with the Phase I e911 regulations.

According to the Phase II e911 regulations, the wireless service provider's network generally provides an initial location estimate (including, but not limited to, the latitude and longitude of the location estimate for the caller's wireless communication device) to the public safety answering point of the emergency services provider upon request therefrom once a voice communication path is established for the emergency call. Subsequently, the dispatcher at the public safety answering point may optionally request updated location estimates for the caller's wireless communication device during the emergency call, but the wireless service provider's network provides such updated location estimates only in response to such "pull" requests.

The ability to issue such "pull" requests to the caller's wireless service provider and to obtain corresponding updated location estimates is extremely important to the dispatcher in those situations where the caller is not substantially stationary. However, in many cases, the dispatcher may not know that the caller is moving until a "pull" request for an updated location estimate is made and the wireless service provider's network provides an updated location estimate indicating that the caller's wireless communication device has moved from the latitude and longitude associated with the initial location estimate. In those cases where the dispatcher knows that the caller is moving, the dispatcher may not know how fast the caller is moving and, as a consequence, does not know how frequently to request updated location estimates. If the dispatcher requests updated location estimates too frequently, the wireless network resources required to provide such estimates may be unnecessarily tied up. Alternatively, if the dispatcher requests updated location estimates too infrequently, the dispatcher may not know the location of the caller's wireless communication device with any reasonable degree of certainty and, hence, cannot accurately direct public safety personnel to the caller's current location. To further aggravate these difficulties, there is always a chance that an updated location estimate may not be as accurate as the initial location estimate.

Notably, in the majority of emergency call situations, the caller making the emergency call is stationary or substantially stationary. As a consequence, the provision of updated location estimates in such situations in response to dispatcher "pull" requests is unnecessary and prevents valuable wireless communication network resources from being utilized for other purposes.

Therefore, there exists within the industry a need for wireless communication system and methods for providing an emergency services provider with updated location estimates for a caller's wireless communication device during an emergency call that addresses these and other problems or difficulties that exist now or in the future.

SUMMARY OF THE INVENTION

Broadly described, the present invention comprises a wireless communication system, including apparatuses and methods, for handling emergency calls from mobile stations to emergency services providers and for automatically providing updated location estimates for the mobile stations to the emergency services providers during such emergency calls and absent any request therefor. More particularly, the present invention comprises a wireless communication system, including apparatuses and methods, for automatically providing such updated location estimates in response to the detected occurrence of a triggering event within the wireless communication system. For example and without limitation, one such triggering event includes the passage of a pre-determined threshold period of time. Another such triggering event includes, for example, the handover of an emergency call between cells or sectors of the wireless communication system in response to movement of the mobile station from which the emergency call is being made. Thus, the automatic provision of updated location estimates by the wireless communication system may be periodic or non-periodic. It should be understood, however, that the scope of the present invention is not limited only to the triggering events described herein.

In the exemplary embodiments, the wireless communication system of the present invention establishes a voice communication path between a mobile station, or wireless communication device, and an emergency services provider (e.g., a public safety organization of a governmental unit) upon receiving a request for an emergency call produced by a user of the wireless communication device placing a "911" call. Thereafter, the wireless communication system handles the emergency call in accordance with at least the Phase I and Phase II e911 governmental regulations pertaining to emergency calls originating from a wireless communication device, including the provision of an initial location estimate and updated location estimates for the wireless communication device in response to requests for such estimates (e.g., "pull" requests) received from the emergency services provider. Additionally and inventively, the wireless communication system of the present invention automatically determines and communicates updated location estimates for the wireless communication device to the emergency services provider during the emergency call and does so absent any request therefor. Because the communication of such updated location estimates to the emergency services provider is performed automatically by the wireless communication system and is initiated solely within the wireless communication system not in response to any externally-generated requests therefor, such updated location estimates are referred to as being "pushed" to the emergency services provider by the wireless communication system of the present invention. In order to trigger the "pushing" of such updated location estimates, the wireless communication system of the present invention is configured to detect the occurrence of a triggering event occurring therewithin with respect to the emergency call and, in response, to determine and "push" such updated location estimates to the emergency services provider. Further, in accordance with at least one exemplary embodiment, the wireless communication system may selectively limit or control the automatic provision of such updated location estimates based on an evaluation of related triggering conditions, including, for example, an evaluation of whether a handover of an emergency call between cells or sectors constitutes substantial or insubstantial movement of the calling wireless communication device.

Advantageously, by automatically determining and "pushing" updated location estimates to emergency services providers during emergency calls from wireless communication devices, the wireless communication system of the present invention allows dispatchers of emergency services providers to know whether the wireless communication devices are stationary or moving and thereby minimizes the need for dispatchers to request updated location estimates in order to make such a determination on their own. Also, such automatic determination and "pushing" of updated location estimates enables dispatchers to know the most recent locations of the wireless communication devices with improved certainty and, hence, allows dispatchers to more accurately direct emergency services responders (e.g., public safety personnel) to the callers' respective locations. As a consequence of providing dispatchers with better information related to the stationary or non-stationary nature of callers' wireless communication devices and their current locations, the wireless communication system of the present invention may substantially reduce the number of unnecessary "pull" requests for updated location estimates that are generated by the dispatchers of emergency services providers and, therefore, improve the utilization of valuable wireless communication network resources.

Other advantages and benefits of the present invention will become apparent upon reading and understanding the present specification when taken in conjunction with the appended drawings.

BRIEF DESCRIPTION OF THE DRAWINGS

FIGS. 8A-8B are flowchart representations of a method for handling an emergency call from a mobile station and for automatically providing updated location estimates for the mobile station to a public safety answering point of an emergency services provider during the emergency call in accordance with a second exemplary embodiment of the present invention.

FIG. 9 is a call flow diagram of messaging associated with the detection of a handover of an emergency call from a mobile station to another cell or sector in accordance with the second exemplary embodiment of the present invention.

DETAILED DESCRIPTION OF THE INVENTION

Figure 1:
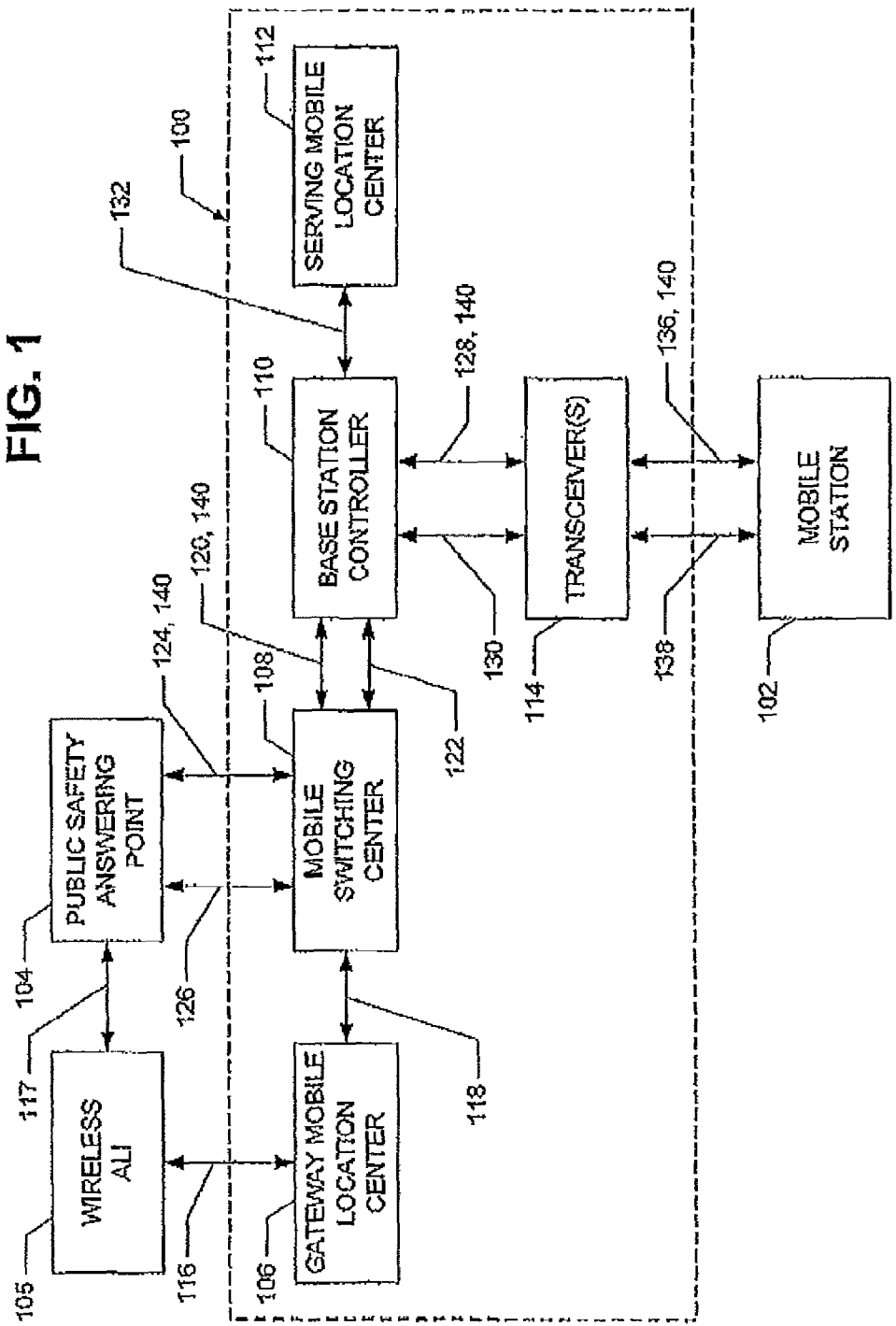
FIG. 1 is a block diagram representation of a wireless communication system for handling emergency calls from mobile stations to public safety answering points of emergency services providers in accordance with the exemplary embodiments of the present invention.

Referring now to the drawings in which like numerals represent like elements or steps throughout the several views, FIG. 1 displays a block diagram representation of a wireless communication system 100 for handling emergency calls from mobile stations 102 to public safety answering points 104 (sometimes referred to herein as "PSAPs 104") of emergency services providers in accordance with the exemplary embodiments of the present invention. Generally, the mobile stations 102 (sometimes referred to herein as "MSs 102" or as "wireless communication devices") include wireless telephones, wireless voice and data communication-enabled personal digital assistants, wireless voice and data communication-enabled computing devices, and other devices having similar wireless voice and data communication capabilities that are, or become, available now or in the future. Each public safety answering point 104 is, typically, associated with an emergency services provider (also sometimes referred to herein as a "public safety organization") of a governmental unit (e.g., city, township, county, parish, or other similar unit) and comprises appropriate communication and/or computer equipment that enables a dispatcher of the public safety organization to answer and talk with a caller during an emergency call. If such equipment is compliant with the Phase II e911 regulations, it is adapted to display the phone number of the caller's communication device (such as, for example, a mobile station 102) and an initial location estimate of the caller's communication device based on data requested and received from a communication network (such as, for example, wireless network 100) handling the emergency call. Additionally, such equipment is operable to generate and communicate requests for data representing updated estimates of the then current location (sometimes referred to herein as an "updated location estimate") of the caller's communication device from the communication network as directed by a dispatcher, to receive and acknowledge receipt of data corresponding to updated location estimates, and to display the then current location of the caller's communication device based on the received updated location estimates.

The wireless communication system 100 (sometimes referred to herein as "wireless communication network 100" or "wireless network 100") comprises a gateway mobile location center 106, mobile switching center 108, base station controller 110, serving mobile location center 112, and a plurality of transceivers 114. Generally, these components of the wireless network 100 are configured to operate and handle wireless communications and signaling according to the global system for mobile communications ("GSM") protocol. However, it should be understood that the scope of the present invention includes all wireless communication systems and/or networks that may operate or be configured to operate according to other protocols and as described herein. It should also be understood that even though much of the description herein is directed toward the handling of a single wireless emergency call by the wireless network 100 for purposes of convenience and clarity and that, as a consequence, only single wireless network components of a particular type are referred to as providing the functionality described herein, the wireless network 100 may handle a plurality of emergency calls from a respective plurality of mobile stations 102, automatically provide updated location estimates for such respective plurality of mobile stations 102 to a respective plurality of public safety answering points 104, and employ multiple wireless network components of a particular type as appropriate to provide such functionality.

The gateway mobile location center 106 (sometimes referred to herein as "GMLC 106") comprises a processing unit, a data storage device storing a database and software program instructions executable by the processing unit, memory, and appropriate data communication interfaces. The gateway mobile location center 106 is adapted to communicatively connect to a wireless automatic location identification system 105, via data communication interfaces of the gateway mobile location center 106 and wireless automatic location identification system 105 and bi-directional communication link 116, during the handling of an emergency call from a mobile station 102. The wireless automatic location identification system 105 (sometimes referred to herein as "wireless ALI 105" or "W-ALI 105") is configured to communicatively connect, during an emergency call, to the communication equipment of an appropriate public safety answering point 104 through its own data communication interfaces and bi-directional communication link 117. The W-ALI 105 is further configured to communicate initial location estimates for mobile stations 102 to the appropriate public safety answering points 104 in response to requests therefor and to communicate, or "push", updated location estimates for mobile stations 102 to the appropriate public safety answering points 104 absent any requests therefor from such public safety answering points 104. Hence, by virtue of the W-ALI 105, bi-directional communication links 116, 117, and respective data communication interfaces, the gateway mobile location center 106 is adapted to connect during the handling of an emergency call to an appropriate public safety answering point 104 for the bi-directional communication of information, data, and/or signals therewith. It should be noted that, although described herein with respect to exemplary embodiments of the present invention as a separate component, the W-ALI 105 might be integral with the gateway mobile location center 106.

The gateway mobile location center 106 is further adapted to communicatively connect to a mobile switching center 108, via the GMLC's data communication interfaces and bi-directional data communication link 118, during the handling of an emergency call from a mobile station 102. Generally, bi-directional communication link 116 is based on the Internet Protocol, bi-directional communication link 117 is based on a proprietary interface of the vendor of the W-ALI 105, and bi-directional communication link 118 includes an SS7 switch. It should be understood, however, that other forms of bi-directional communication links 116, 117, 118 might be employed within the scope of the invention.

During operation, the processing unit of the gateway mobile location center 106 executes the GMLC's software program instructions such that the gateway mobile location center 106 is operable to perform according to the methods described herein and to bi-directionally communicate messages, signals, and data with the public safety answering points 104 (i.e., via an appropriate W-ALI 105 and bi-directional communication links 116, 117) and mobile switching center 108 through bi-directional data communication link 118. More particularly, the gateway mobile location center 106 is operable to: receive an initial message from the mobile switching center 108 for an emergency call that includes the emergency services routing digits and phone number for the mobile station 102 from which the emergency call originated; assign an emergency services routing key to the emergency call and return same to the mobile switching center 108; instruct the mobile switching center 108 to set up a voice communication path 140 between an appropriate public safety answering point 104 and the mobile station 102; receive messages from the public safety answering point 104 (i.e., via an appropriate W-ALI 105 and bi-directional communication links 116, 117) requesting data representative of the phone number, initial location estimate, and updated location estimates of the mobile station 102; communicate messages to the public safety answering point 104 (i.e., via an appropriate W-ALI 105 and bi-directional communication links 116, 117) in response thereto that include such data; and exchange messages with the mobile switching center 108 to receive and acknowledge the receipt of data representative of the initial location estimate of the mobile-station 102.

The gateway mobile location center 106 is further operable during an emergency call to: initialize and re-initialize trigger-related timers and/or conditions; communicate messages to the mobile switching center 108 requesting data representative of updated location estimates of the mobile station 102 upon occurrences of a triggering event and satisfaction of trigger-related conditions, if any; receive messages from the mobile switching center 108 including such data in response to such requesting messages; communicate, or push, messages including data representative of updated location estimates of the mobile station 102 to the public safety answering point 104 (i.e., via an appropriate W-ALI 105 and bi-directional communication links 116, 117) upon occurrences of a triggering event and satisfaction of trigger-related conditions, if any, and absent requests for such data from the public safety answering point 104; and, receive messages from the public safety answering point 104 (i.e., via an appropriate W-ALI 105 and bi-directional communication links 116, 117) acknowledging the receipt of data representative of updated location estimates of the mobile station 102 so pushed to the public safety answering point 104. The gateway mobile location center 106 is still further operable to access enablement data in the GMLC's database that designates whether the provision, communication, or pushing, of data representative of updated location estimates for mobile station 102 is enabled for the mobile switching center 108, and to determine whether such updated location estimate data should or should not be communicated, or pushed, to the public safety answering point 104 upon occurrences of a triggering event.

The mobile switching center 108 (sometimes referred to herein as "MSC 108") comprises a processing unit, a data storage device storing software program instructions executable by the processing unit, memory, and voice and data communication interfaces. The mobile switching center 108 is adapted to communicatively connect to the gateway mobile communication center 106 as described above, through bi-directional data communication link 118, during the handling of an emergency call from a mobile station 102. The mobile switching center 108 is also adapted to communicatively connect to the base station controller 110, via the MSC's voice and data communication interfaces and respective bi-directional voice and data communication links 120, 122, during the handling of the emergency call in order to bi-directionally communicate speech, sounds, messages, signals, and data with the base station controller 110. Additionally, the mobile switching center 108 is configured to communicatively connect to the public safety answering point 104, through bi-directional voice communication trunks 124 and data communication link 126, during the handling of the emergency call for the bi-directional communication of speech, sounds, and data between the mobile switching center 108 and public safety answering point 104.

During operation, the processing unit of the mobile switching center 108 executes the MSC's software program instructions such that the mobile switching center 108 is operable to perform according to the methods described herein and to bi-directionally communicate speech, sounds, messages, signals, and data between the base station controller 110, public safety answering point 104, and gateway mobile location center 106 as appropriate. More particularly, the mobile switching center 108 is operable to: receive a message from the base station controller 110 requesting a voice communication path 140 between the calling mobile station 102 and the appropriate public safety answering point 104 (i.e., corresponding to an emergency call); communicate an initial message for the emergency call to the gateway mobile location center 106 including the emergency services routing digits and the phone number for the mobile station 102 from which the emergency call originated; receive a response to the initial message from the gateway mobile location center 106 including an emergency services routing key for the emergency call; set up a voice communication path 140 (including, for example, voice communication trunks 124, voice communication links 120, 128, and voice communication channels 136) for the emergency call between the mobile station 102 and the public safety answering point 104 in response to receiving the emergency services routing key; and, communicate the emergency service routing key for the emergency call to the public safety answering point 104.

The mobile switching center 108 is further operable during an emergency call to: automatically communicate a message to the base station controller 110 requesting an initial location estimate for the calling mobile station 102; receive a message from the base station controller 110 including an initial location estimate for the mobile station 102 in response thereto; communicate a message including an initial location estimate for the mobile station 102 to the gateway mobile location center 106; and, receive a message from the gateway mobile location center 106 acknowledging receipt of the initial location estimate. Additionally, the mobile switching center 108 is further operable during an emergency call to: receive messages from the gateway mobile location center 106 requesting updated location estimates for the mobile station 102; communicate messages to the gateway mobile location center 106 including such updated location estimates for the mobile station 102 in response thereto; communicate messages to the base station controller 110 requesting such updated location estimates for the mobile station 102; and, in response thereto, receive messages from the base station controller 110 including such requested updated location estimates. During an emergency call, the mobile switching center 108 is still further operable to: receive messages from the base station controller 110 indicating that the base station controller 110 has detected movement of the mobile station 102 and including information or data comprising the phone number for the calling mobile station 102, the identifier for the mobile switching center 108, and the global identifier for the cell or sector, as the case may be, in which the mobile station 102 is present; responsive thereto, communicate messages to the base station controller 110 acknowledging receipt of such information; communicate messages to the gateway mobile location center 106 including such information; and, receive messages from the gateway mobile location center 106 acknowledging the receipt of such information.

The base station controller 110 (sometimes referred to herein as "BSC 110") comprises a processing unit, a data storage device storing software program instructions executable by the processing unit, memory, and appropriate voice and data communication interfaces. The base station controller 110 is adapted to communicatively connect to the mobile switching center 108 as described above, through bi-directional voice and data communication links 120, 122, during the handling of an emergency call from a mobile station 102. Also, the base station controller 110 is adapted to communicatively connect to transceivers 114 via the BSC's voice and data communication interfaces and respective bi-directional voice and data communication links 128, 130. Additionally, the base station controller 110 is configured to connect to the serving mobile location center 112, via data communication link 132, for the bi-directional communication of data therewith. Typically, data communication link 132 includes an SS7 switch.

During operation, the processing unit of the base station controller 110 executes the BSC's software program instructions such that the base station controller 110 is operable to perform according to the methods described herein and to bi-directionally communicate speech, sounds, messages, signals, and data with the mobile switching center 108 and transceivers 114 through respective bi-directional voice communication links 120, 128 and bi-directional data communication links 122, 130. The base station controller 110 is also operable to bi-directionally communicate messages, signals, and data with the serving mobile location center 112 via data communication link 132. More particularly, the base station controller 110 is operable to: receive a message from a calling mobile station 102 requesting a voice communication path 140 between the mobile station 102 and the appropriate public safety answering point 104 (i.e., corresponding to an emergency call); responsive thereto, communicate a message to the mobile switching center 108 requesting such voice communication path 140; receive a message from the mobile switching center 108 requesting an initial location estimate for the mobile station 102; communicate a message to the mobile switching center 108 including such initial location estimate for the mobile station 102 in response thereto; communicate a message to the serving mobile location center 112 requesting such initial location estimate; and, in response, receive a message from the serving mobile location center 112 including such initial location estimate.

The base station controller 110 is further operable during an emergency call to: receive messages from the mobile switching center 108 requesting updated location estimates for the mobile station 102; communicate messages to the mobile switching center 108 including such updated location estimates for the mobile station 102 in response thereto; communicate messages to the serving mobile location center 112 requesting such updated location estimates for the mobile station 102; and, in response thereto, receive messages from the serving mobile location center 112 including such requested updated location estimates. During an emergency call, the base station controller 110 is still further operable to: detect handovers, if any, of the emergency call between cells or sectors, as the case may be; communicate messages to the mobile switching center 108 indicating that the base station controller 110 has detected handovers (e.g., movement) of the mobile station 102 and including information or data comprising the phone number for the calling mobile station 102, the identifier for the mobile switching center 108, and the global identifier for the cell or sector, as the case may be, in which the mobile station 102 is present; and, receive messages from the mobile switching center 108 acknowledging receipt of such indicating messages and information in response thereto.

The serving mobile location center 112 (sometimes referred to herein as "SMLC 112") comprises a processing unit, a data storage device storing software program instructions executable by the processing unit, memory, and appropriate data communication interfaces. The serving mobile location center 112 is adapted to communicatively connect to the base station controller 110 as described above through bi-directional data communication link 132 during the handling of an emergency call from a mobile station 102. The processing unit of the serving mobile location center 112 executes the SMLC's software program instructions during operation such that the serving mobile location center 112 is operable to perform according to the methods described herein and to bi-directionally communicate messages, signals, and data with base station controller 110 through bi-directional data communication link 132. More particularly, the serving mobile location center 112 is operable to: receive messages from the base station controller 110 requesting initial and updated location estimates for the mobile station 102; and in response thereto, determine initial and updated location estimates for the mobile station 102 and communicate messages including same to the base station controller 110. According to the exemplary embodiments of the present invention, the serving mobile location center 112 uses data representative of the then present location of the mobile station 102 (e.g., collected from one or more location measurement units ("LMUs")) and triangulation techniques in order to determine initial and updated location estimates for the mobile station 102. However, it should be understood that other data, equipment, and/or methods might be employed within the scope of the present invention to determine initial and updated location estimates of the mobile station 102.

Each transceiver 114 generally includes a transmitter, receiver, and antenna for bi-directionally communicating voice and data signals with the mobile station 102 via respective wireless bi-directional voice and data communication channels 136, 138. Typically, each transceiver 114 is associated with a particular cell or sector, as the case may be, and has its antenna mounted to a tower, building, or other structure appropriate to enable the antenna to service the cell or sector.

Figure 2:
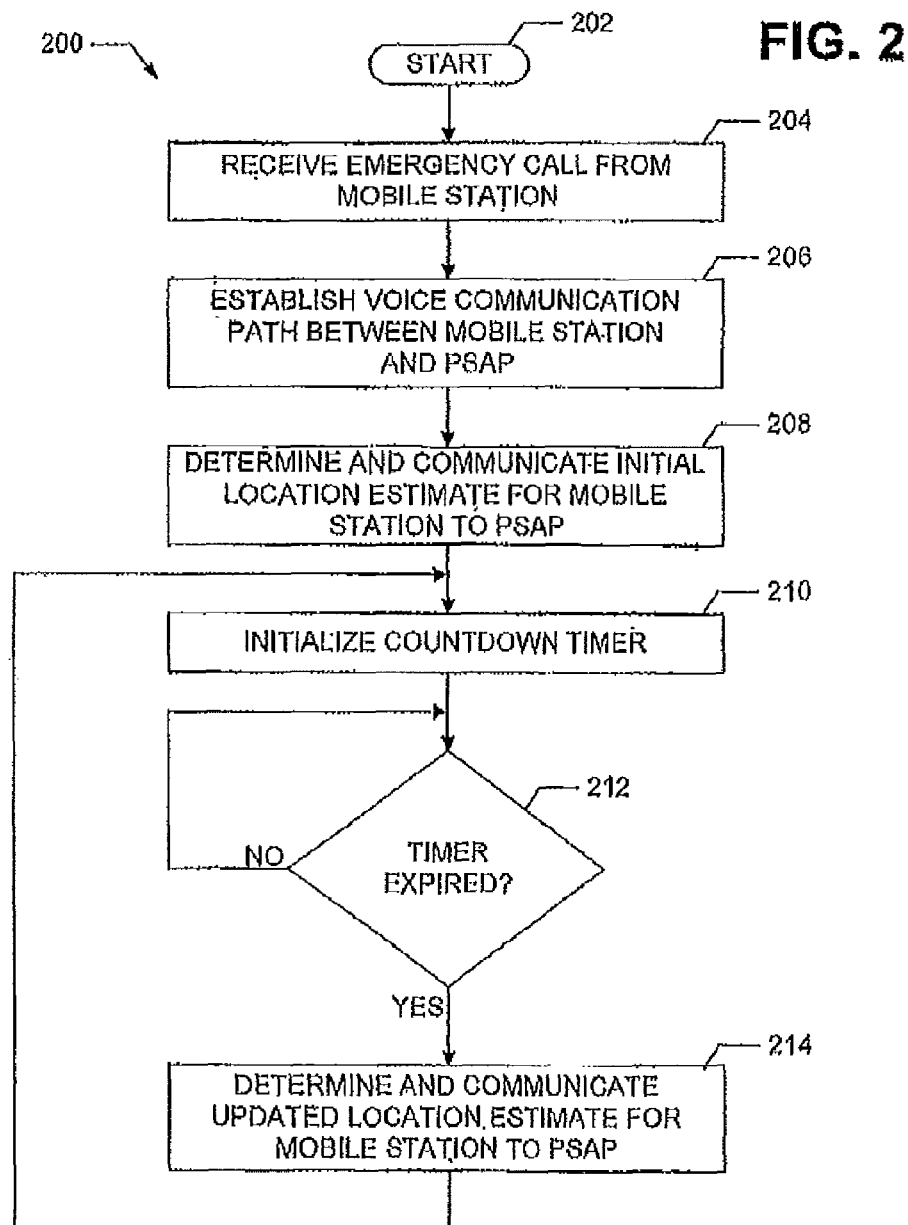
FIG. 2 is a flowchart representation of a method for handling an emergency call from a mobile station and for automatically providing updated location estimates for the mobile station to a public safety answering point of an emergency services provider during the emergency call in accordance with a first exemplary embodiment of the present invention.

FIG. 2 displays a flowchart representation of a method for handling an emergency call from a mobile station 102 and for automatically providing updated location estimates for the mobile station 102 to a public safety answering point 104 of an emergency services provider during the emergency call 200 (sometimes referred to herein as "method 200") in accordance with a first exemplary embodiment of the present invention. When operated according to method 200, the wireless network 100 automatically provides, or pushes, such updated location estimate information to the public safety answering point 104 (via W-ALI 105 and bi-directional communication links 116, 117) upon the occurrence of a triggering event generated within the wireless network 100, which in the first exemplary embodiment, comprises a countdown timer reaching zero after counting down from an initial amount of time. Notably, the provision, or communication, of such updated location estimate information is made absent any request from the public safety answering point 104 (or, for that matter, absent any request from outside of the wireless network 100) and is, generally, made on a periodic basis during an emergency call as the countdown timer is reinitialized after each communication of updated location estimate information to the public safety answering point 104.

Figure 6:
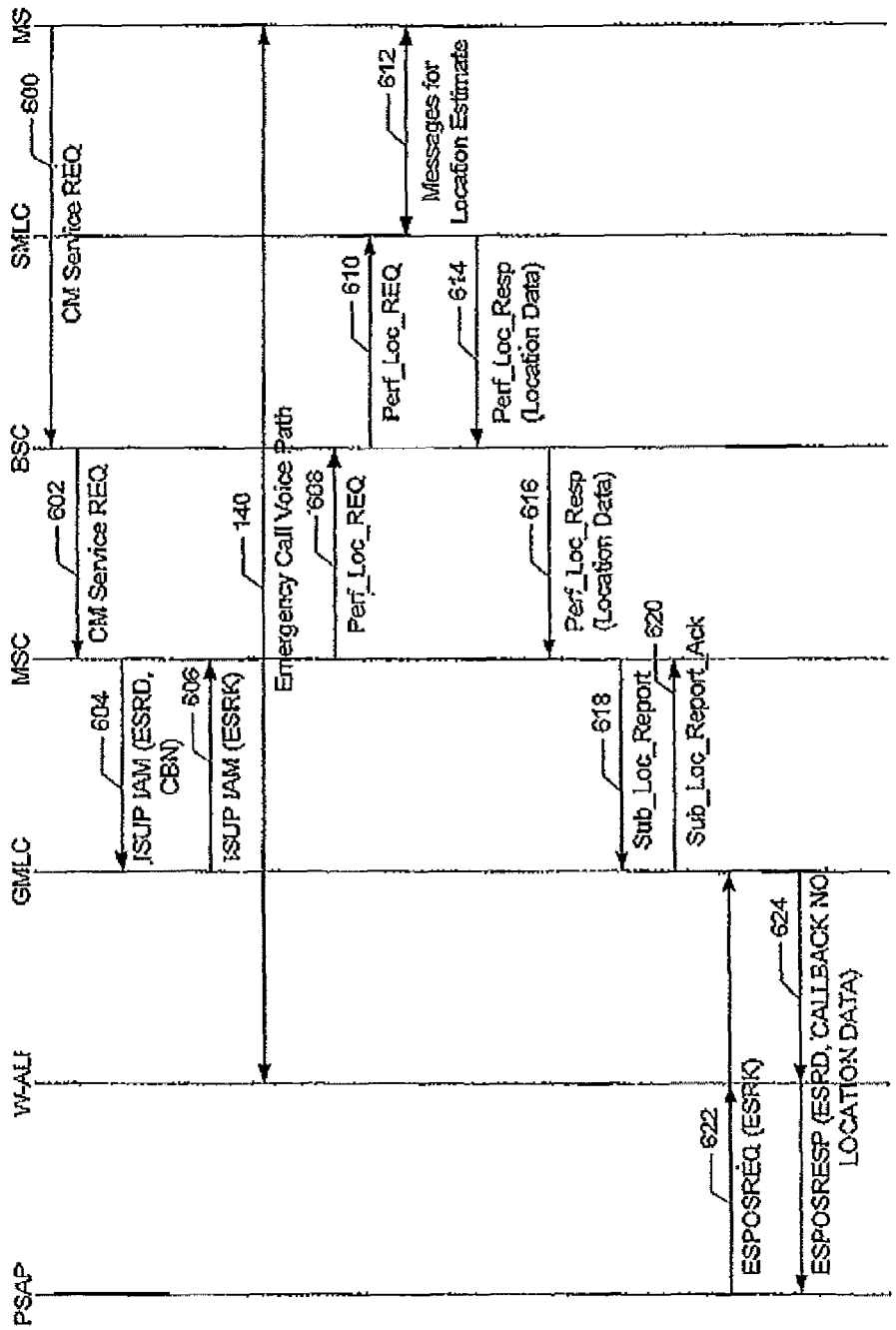
FIG. 6 is a call flow diagram of messaging associated with the initial set up of an emergency call from a mobile station to a public safety answering point of an emergency services provider by the wireless communication system in accordance with the exemplary embodiments of the present invention.

After starting at step 202, method 200 advances to step 204 where the wireless network 100 receives a connection management service request message 600 (see FIG. 6) from a mobile station 102 to establish an emergency call between the mobile station 102 and an appropriate public safety answering point 104 in response to a user of the mobile station 102 (i.e., a caller) making an emergency call. More particularly and as illustrated by FIGS. 1 and 6, the base station controller 110 of the wireless network 100 receives the connection management service request message 600 from the mobile station 102 via the transceiver(s) 114 that provide wireless communication services for the wireless communication cell or sector in which the mobile station 102 is then present. Next, method 200 proceeds to step 206 thereof where the wireless network 100 establishes a voice communication path 140 between the appropriate public safety answering point 104 and the mobile station 102 to enable voice communication between a dispatcher at the public safety answering point 104 and the caller. In accordance with the exemplary embodiments described herein, set up of the voice communication path 140 is initiated by the base station controller 110 messaging the mobile switching center 108 and is subsequently completed by the mobile switching center 108 connecting voice communication trunks 124, voice communication links 120, 128, and wireless voice communication channel 136. A more detailed description of the steps and intra-network messaging used to accomplish establishment of the voice communication path are included below with respect to FIGS. 3 and 6.

Proceeding to step 208, the wireless network 100 determines and communicates an initial location estimate for the mobile station 102 to the public safety answering point 104. Typically, the initial location estimate is provided to the public safety answering point 104 (via W-ALI 105 and bi-directional communication links 116, 117) by the wireless network 100 in response to the wireless network 104 (and, more specifically, the gateway mobile location center 106) receiving a message from the public safety answering point 104 (via W-ALI 105 and bi-directional communication links 116, 117) requesting that the wireless network 100 send it an initial location estimate for the mobile station 102. In accordance with the exemplary embodiments, the initial location estimate is usually determined through the use of triangulation techniques using data collected by the serving mobile location center 112. Generally, the initial location estimate comprises data representing the estimated latitude and longitude of the location of the mobile station 102 when the caller made the emergency call. The steps associated with the determination and communication of the initial location estimate for the mobile station 102 are described more fully below with reference to FIG. 4. It should be noted that the initial location estimate might be determined within the scope of the present invention, however, through the use of other data, equipment, and/or methods.

Continuing at step 210 of method 200, the wireless network 100 (and, more specifically, the gateway mobile location center 106) initializes a countdown timer to a pre-determined period of time and starts the countdown timer counting down toward zero. The pre-determined period of time represents the amount of time that will elapse between the automatic determination and communication, or pushing, of consecutive updated location estimates for the then current respective locations of the mobile station 102 to the public safety answering point 104. It should be noted that the wireless network 100 might be configured such that a different pre-determined period of time is used for triggering the automatic determination and communication of mobile station updated location estimates for each different public safety answering point 104 with which the wireless network 100 communicates. The pre-determined period of time for use with a particular public safety answering point 104 may be selected to: maximize the currency of the estimated location of a mobile station 102; minimize the impact on or use of network resources; adhere to constraints and/or requirements imposed by hardware and/or software at the public safety answering point 104; meet respective public safety organizations' and/or dispatchers' preferences for the currency of the estimated location of a mobile station 102; and/or optimize any combination of the foregoing. It should be understood that the scope of the present invention comprises the use of hardware and software timers, count up and countdown timers, and timers that are configured to count between non-zero starting and ending values.

At step 212, the wireless network 100 (and, more specifically, the gateway mobile location center 106) determines whether the countdown timer has reached zero (i.e., expired) after counting down the pre-determined amount of time to which it was initialized at step 210. If the countdown timer has not reached zero, then no triggering event has occurred and the gateway mobile location center 106 loops back to step 212 to again determine whether the countdown timer has expired. Alternatively, if the countdown timer has reached zero, a triggering event (i.e., expiration of the tinier) has occurred and the gateway mobile location center 106 advances to step 214 of method 200 where the wireless network 100 determines and communicates an updated location estimate for the mobile station 102 to the public safety answering point 104 via the gateway mobile location center 106, W-ALI 105, and data communication links 116, 117. The provision of such updated location estimate is performed, generally, in accordance with the steps of method 500 described below with respect to FIG. 5.

It should be remembered that the provision, communication, or pushing of updated location estimate information to the public safety answering point 104 is made absent any request from the public safety answering point 104 for such information. It should be further remembered that such provision, communication, or pushing of updated location estimate information for the mobile station 102 continues according to methods 200, 500 until the emergency call is disconnected, dropped, or terminated by the caller, by a dispatcher of the public safety organization, or by the occurrence of another event.

Figure 3:
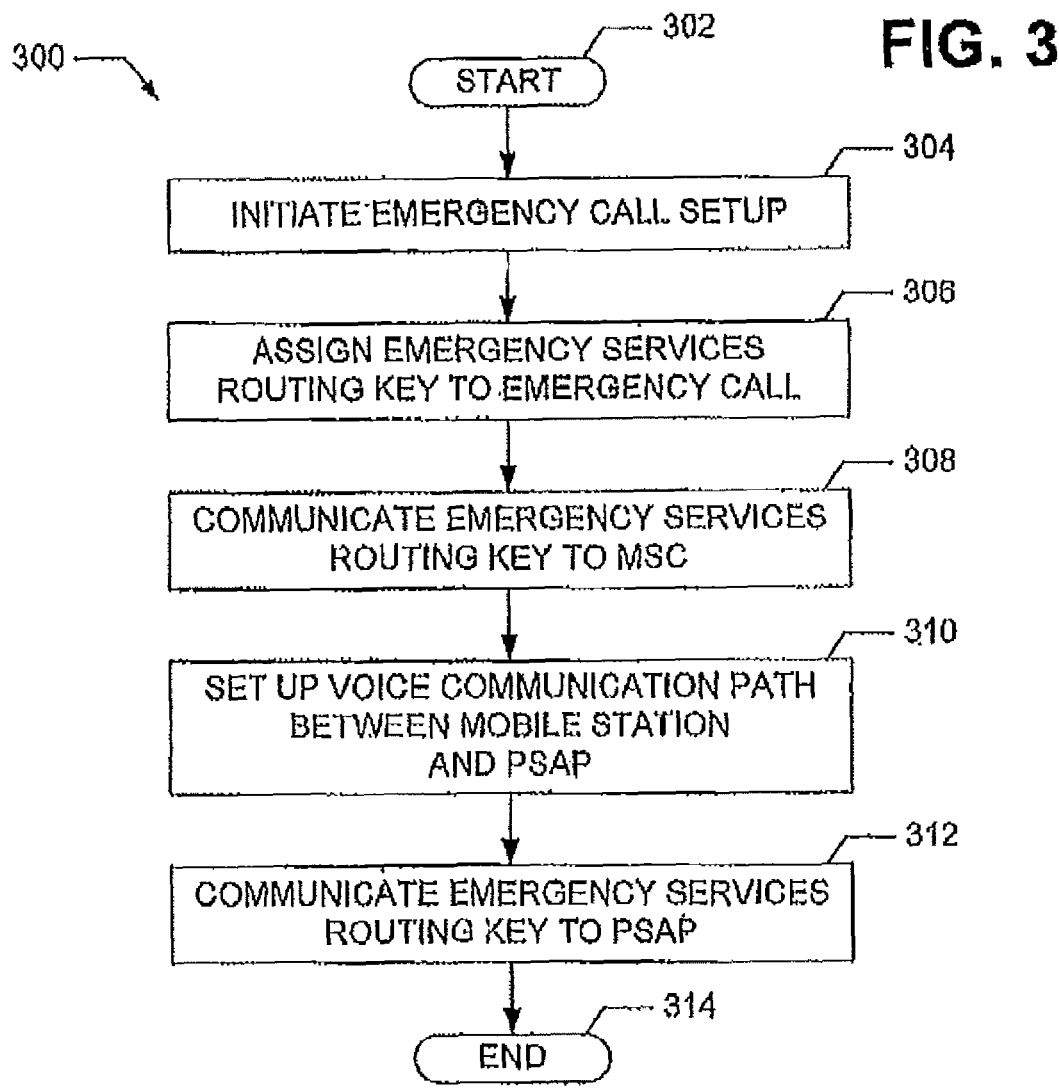
FIG. 3 is a flowchart representation of a method for establishing a voice communication path between a mobile station requesting an emergency call and a public safety answering point of an emergency services provider in accordance with the exemplary embodiments of the present invention.

FIG. 3 displays a flowchart representation of a method for establishing a voice communication path 300 between a mobile station 102 requesting an emergency call and a public safety answering point 104 of an emergency services provider in accordance with a first exemplary embodiment of the present invention. After starting at step 302 of the method for establishing a voice communication path 300 (sometimes referred to herein as "method 300"), the wireless network 100 initiates set up of the emergency call with the base station controller 110 communicating a message 602 to the mobile switching center 108 through data communication link 122 at step 304. Generally, the message 602 comprises a connection management service request ("CM Service Request") message as illustrated in FIG. 6. Upon receiving message 602 and as part of initiating set up of the emergency call at step 304, the mobile switching center 108 subsequently communicates a message 604 to the gateway mobile location center 106 via data communication link 118. As displayed in FIG. 6, the message 604, typically, comprises an integrated services user part initial address ("ISUP JAM") message and includes information such as (a) the emergency services routing digits ("ESRD") associated with the cell site in which the mobile station 102 was present when requesting the emergency call and (b) the call back number for the mobile station 102.

After receiving message 604 from the mobile switching center 108, the gateway mobile location center 106 assigns an emergency services routing key ("ESRK") to the emergency call at step 306. The emergency services routing key uniquely identifies the emergency call and is used in communications with the public safety answering point 104 as described below. The gateway mobile location center 106 then, at step 308, communicates a message 606 to the mobile switching center 108, via data communication link 118, providing the assigned emergency service routing key and directing the mobile switching center 108 to set up a voice communication path 140 between the public safety answering point 104 and the mobile station 102. The message 606, generally, comprises an integrated services use part initial address ("ISUP IAM") message that includes the assigned emergency service routing key (see FIG. 6). Upon receiving message 606 from the gateway mobile location center 106, the mobile switching center 108 sets up a voice communication path 140 between the public safety answering point 104 and the mobile station 102 at step 310. Then, at step 312, the mobile switching center 108 communicates the emergency services routing key to the public safety answering point 104 through data communication link 126. Once the emergency services routing key has been communicated to the public safety answering point 104, operation of the wireless network 100 in accordance with method 300 ends at step 314.

Figure 4:
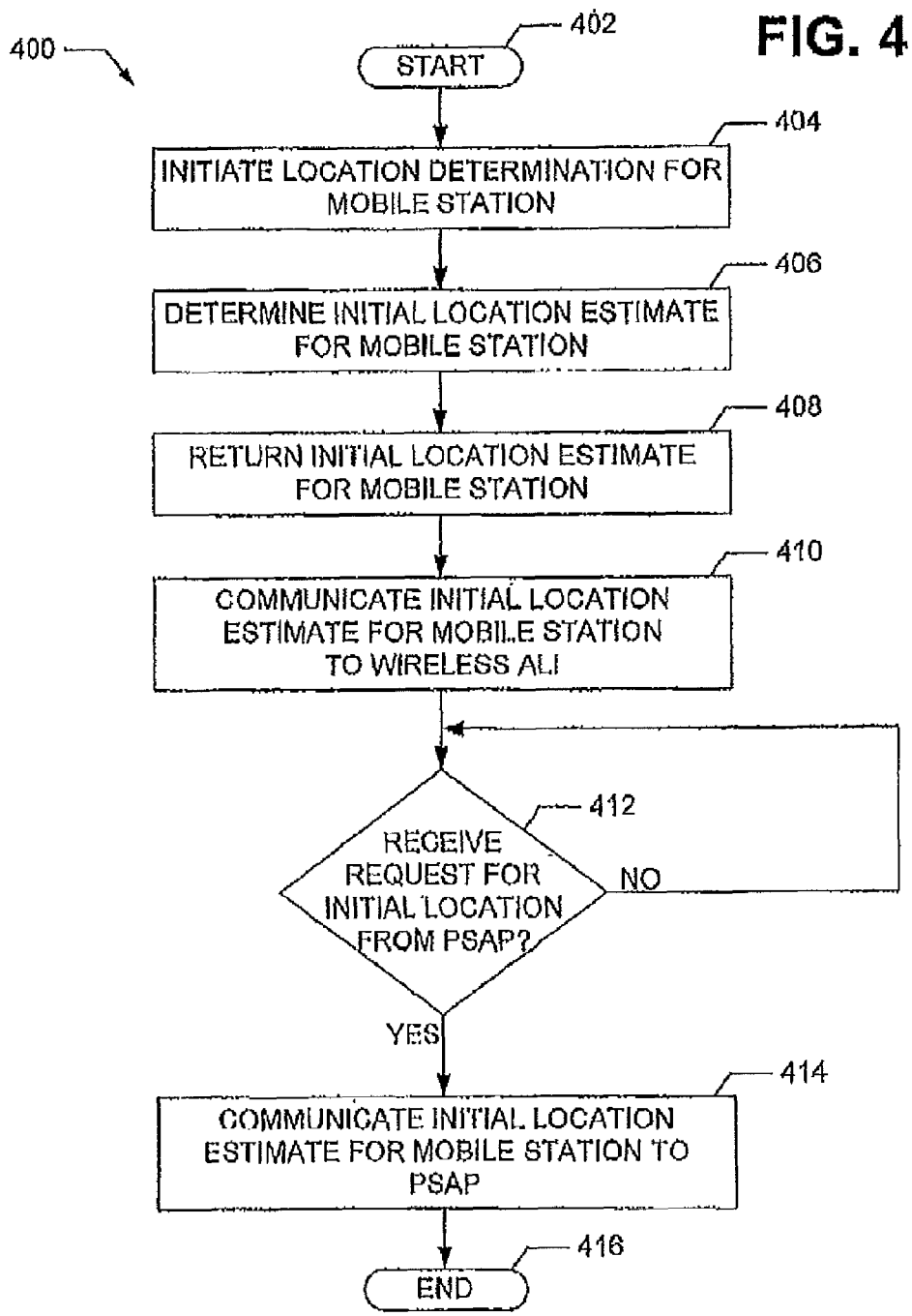
FIG. 4 is a flowchart representation of a method for determining and communicating an initial location estimate for a mobile station to a public safety answering point of an emergency services provider in accordance with the exemplary embodiments of the present invention.

FIG. 4 displays a flowchart representation of a method for determining and communicating an initial location estimate for a mobile station 102 to a public safety answering point 104 of an emergency services provider in accordance with the first exemplary embodiment of the present invention. As described briefly above with respect to FIG. 2, the wireless network 100 determines and communicates an initial location estimate for the mobile station 102 to the public safety answering point 104 after a voice communication path 140 is established for an emergency call placed from the mobile station 102. To do so, the wireless network 100 operates in accordance with the method of determining and communicating an initial location estimate 400 (sometimes referred to herein as "method 400") described below and automatically determines an initial location estimate for the mobile station 102 prior to receiving a request for same from the public safety answering point 104 handling the emergency call.

After starting operation according to method 400 at step 402, the wireless network 100 automatically initiates the determination of an initial location estimate for the mobile station 102 at step 404 by internally communicating a series of messages 608, 610. First, the mobile switching center 108 communicates a message 608 to the base station controller 110 through data communication link 122 to request the performance of a location determination for the mobile station 102. Generally, message 608 comprises a perform location request ("Perf_Loc_REQ") message as illustrated in FIG. 6. Then, in response to receiving message 608, the base station controller 110 communicates a message 610 via data communication link 132 to the servicing mobile location center 112 to request that it determine the location of the mobile station 102. Similar to message 608 described above, message 610 also, typically, comprises a perform location request ("Perf_Loc_REQ") message (see FIG. 6).

Continuing at step 406 of method 400, the servicing mobile location center 112 communicates and receives messages 612 (see FIG. 6) with various location measurement units appropriate and necessary to determine an initial location estimate for the mobile station 102. Generally, in accordance with the exemplary embodiments, the initial location estimate is made using triangulation techniques (e.g., known to one of ordinary skill in the art) and data collected by the servicing mobile location center 112 from the location measurement units via messages 612 that pertains to the initial location of the mobile station 102. The initial location estimate is represented by location estimate data comprising, typically, an estimated latitude and longitude for the mobile station 102 and a statistically-generated number corresponding to the number of meters around the intersection of the estimated latitude and longitude in which there is a pre-determined percentage of confidence that the mobile station 102 is present. It should be remembered that other equipment, messaging, and methods (i.e., other than triangulation) might be employed by the wireless network 100 within the scope of the present invention to determine the initial location estimate.

Once an initial location estimate has been determined for the mobile station 102, the initial location estimate is returned to the mobile switching center 108, at step 408, through a series of messages 614, 616 communicated internally within the wireless network 100. First, the servicing mobile location center 112 communicates a message 614, via data communication link 132, to the base station controller 110 including the location estimate data corresponding to the initial location estimate for the mobile station 102 when the emergency call was requested by the mobile station 102. Generally, message 614 comprises a perform location response ("Perf_Loc_Resp") message (see FIG. 6). Subsequently, in response to receiving message 614 from the servicing mobile location center 112, the base station controller 110 communicates a message 616 to the mobile switching center 108 through data communication link 122. Message 616, similar to message 614, typically comprises a perform location response ("Perf_Loc_Resp") message (see FIG. 6) including the location estimate data corresponding to the initial location estimate for the mobile station 102 when the emergency call was requested by the mobile station 102. After the location estimate data has been received, the mobile switching center 108 communicates a message 618 to the gateway mobile location center 106 via data communication link 118 including the location estimate data. As illustrated in FIG. 6, the message 618 is, generally, in the form of a "Sub_Loc_Report" message. Upon receiving message 618 from the mobile switching center 108, the gateway mobile location center 106 acknowledges the receipt of the initial location estimate from the mobile switching center 108 by communicating an acknowledgement message 620 thereto through data communication link 118. The acknowledgement message 620, typically, comprises a "Sub Loc_Report_Ack" message as displayed in FIG. 6.

After the gateway mobile location center 106 receives the initial location estimate and at step 410, the gateway mobile location center 106 communicates a message 624 to the W-ALI 105 via data communication link 116 providing the initial location estimate to the W-ALI 105. Generally, the message 624 is communicated by the gateway mobile location center 106 to the W-ALI 105 in the form of a "ESPOSRESP" message (see FIG. 6) that includes (a) the emergency services routing digits, (b) the callback number of the mobile station 102, and (c) the location estimate data representing the initial location estimate for the mobile station 102. Then, at step 412, the W-ALI 105 determines whether it has received a request for an initial location estimate for the mobile station 102 from the public safety answering point 104 handling the emergency call. Generally, such request is in the form of an emergency services position request ("ESPOSREQ") message 622 (see FIG. 6) communicated by the public safety answering point 104 to the W-ALI 105 via data communication link 117. The message 622 includes the emergency services routing key uniquely associated with the emergency call in order to enable the W-ALI 105 to identify the emergency call from all other emergency calls possibly being handled by the W-ALI 105.

If at step 412, the W-ALI 105 determines that it has not received a request for an initial location estimate, method 400 loops back to step 412 to continue waiting for such a request. Alternatively, if at step 412, the W-ALI 105 determines that it has received a request for an initial location estimate for the mobile station 102 from the public safety answering point 104, the W-ALI 105 further communicates message 624 to the public safety answering point 104 through data communication link 117 at step 414, thereby providing the initial location estimate for the mobile station 102 to the public safety answering point 104. Method 400 then ends at step 416.

Figure 5:
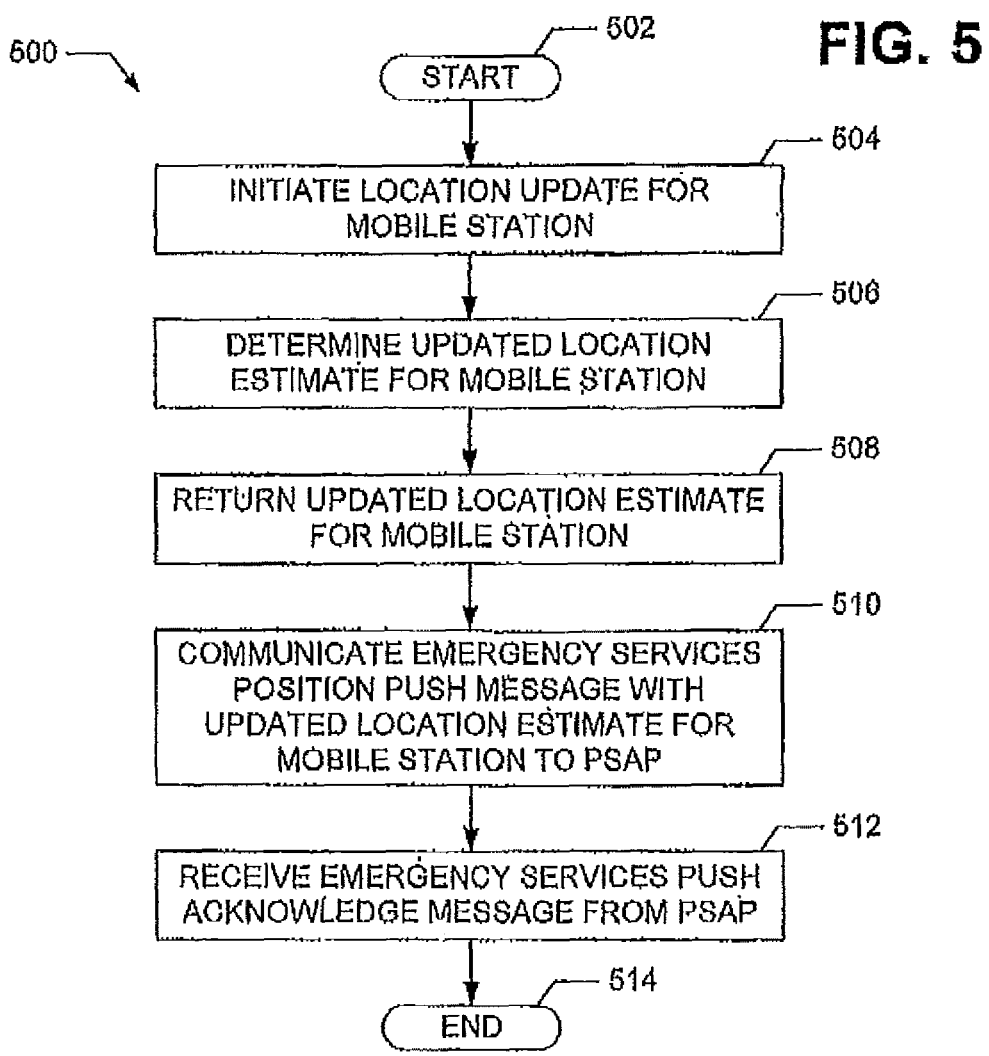
FIG. 5 is a flowchart representation of a method for determining and communicating an updated location estimate for a mobile station to a public safety answering point of an emergency services provider in accordance with the first exemplary embodiment of the present invention.

FIG. 5 displays a flowchart representation of a method for determining and communicating an updated location estimate for a mobile station 102 to a public safety answering point 104 of an emergency services provider in accordance with the first exemplary embodiment of the present invention. As described briefly above with respect to FIG. 2, the wireless network 100 automatically determines and communicates updated location estimate information for the mobile station 102 to the public safety answering point 104 during the emergency call between the mobile station 102 and public safety answering point 104 upon the occurrence of an internally generated triggering event. Operating in accordance with the method for determining and communicating an updated location estimate 500 (sometimes referred to herein as "method 500"), the wireless network 100 "pushes" the updated location estimate information for the mobile station 102 to the public safety answering point 104 (i.e., via bi-directional communication links 116, 117 and W-ALI 105 which further communicates, or "pushes", the updated location estimate information) handling the emergency call absent a request for such information from the public safety answering point 104.

Figure 7:
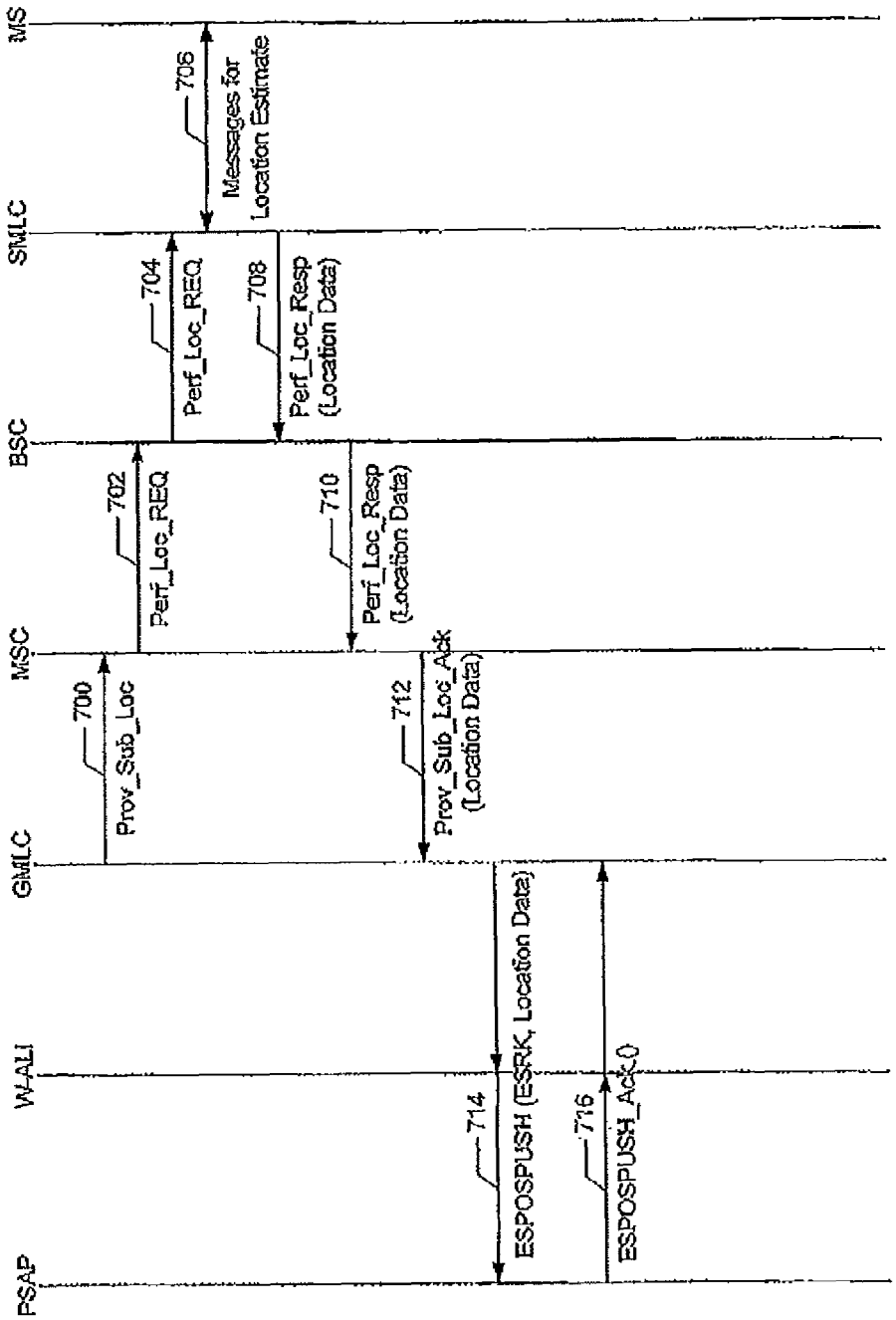
FIG. 7 is a call flow diagram of messaging associated with the automatic determination and communication of updated location estimates for the mobile station during an emergency call in accordance with the exemplary embodiments of the present invention.

After starting at step 502 of method 500, the wireless network 100 initiates the determination of an updated location estimate for the mobile station 102 at step 504 by internally communicating a series of messages 700, 702, 704. Initially, the gateway mobile location center 106 communicates a message 700 to the mobile switching center 108, via data communication link 118, to request an updated location determination for the mobile station 102. Message 700 generally comprises a provide location request ("Prov_Sub_Loc") message as displayed in FIG. 7. Then, upon receiving message 700, the mobile switching center 108 communicates message 702 to the base station controller 110 through data communication link 122 to request the performance of a location determination for the mobile station 102. Generally, as illustrated in FIG. 7, message 702 comprises a perform location request ("Perf_Loc_REQ") message. After receiving message 702, the base station controller 110 communicates message 704 to the serving mobile location center 112, via data communication link 132, requesting that the serving mobile location center 112 determine the current location of the mobile station 102. Similar to message 702 described above, message 704 also, typically, comprises a perform location request ("Perf_Loc_REQ") message (see FIG. 7).

Proceeding to step 506, the servicing mobile location center 112 determines an updated location estimate for the mobile station 102. Similar to the initial location estimate and according to the first exemplary embodiment, the updated location estimate is made using triangulation techniques (e.g., known to one of ordinary skill in the art) and data collected by the servicing mobile location center 112 from various location measurement units, via the communication of messages 706, pertaining to the mobile station's then current location. The updated location estimate is also represented by location estimate data comprising, typically, an estimated latitude and longitude for the mobile station 102 and a statistically-generated number corresponding to the number of meters around the intersection of the estimated latitude and longitude in which there is a per-determined percentage of confidence that the mobile station 102 is present. It should be remembered that the scope of the present invention further includes the use of other equipment, data, and/or methods for determining the present location of the mobile station 102.

Upon determining an updated location estimate for the mobile station 102, the updated location estimate is returned, at step 508, to the gateway mobile location center 106 via a series of messages 708, 710, 712 communicated internally within the wireless network 100. First, the servicing mobile location center 112 communicates message 708 to the base station controller 110 through data communication link 132. Message 708 includes location estimate data corresponding to the updated location estimate for the mobile station 102. Generally, message 708 comprises a perform location response ("Perf_Loc_Resp") message (see FIG. 7). Then, the base station controller 110 communicates a message 710 to the mobile switching center 108 through data communication link 122 in response to receiving message 708 from the servicing mobile location center 112. Similar to message 708, message 710 typically comprises a perform location response ("Perf_Loc_Resp") message (see FIG. 7) including the location estimate data corresponding to the updated location estimate for the mobile station 102. Next, after receiving message 710, the mobile switching center 108 communicates a message 712 to the gateway mobile location center 106 via data communication link 118 including the location estimate data corresponding to the updated location estimate. As illustrated in FIG. 7, the message 712 is, generally, in the form of a "Prov_Sub_Loc_Ack" message.

At step 510 of method 500, the wireless network 100 (and, more specifically, the gateway mobile location center 106) communicates a message 714 including the updated location estimate for the mobile station 102 to the public safety answering point 104. Such communication is, generally, accomplished by the communication of message 714 to the W-ALI 105 via data communication link 116, followed by the W-ALI 105 then communicating message 714 on to the public safety answering point 104 through data communication link 117. The message 714 generally includes the emergency services routing key and the location estimate data corresponding to the updated location estimate. Inclusion of the emergency services routing key serves to inform the public safety answering point 104 as to which emergency call the update location estimate corresponds. This is important since the public safety answering point 104 may be then handling a plurality of emergency calls and since the updated location estimate is provided without a request from the public safety answering point 104. Typically, message 714 comprises an emergency services position push ("ESPOSPUSH") message. Because the updated location estimate has not requested by the public safety answering point 104, such communication of the updated location estimate to the public safety answering point 104 is referred to as a "pushing" of the updated location estimate.

In response to receiving the updated location estimate pushed to the public safety answering point 104 by the communication of message 714, the public safety answering point 104 communicates a message 716 to the wireless network 100 through W-ALI 105 and bi-directional communication links 116, 117 acknowledging receipt of the updated location estimate. The wireless network 100 (and, more particularly, the gateway mobile location center 106) receives message 716 at step 512 of method 500. Generally, as displayed in FIG. 7, message 716 comprises an emergency services position push acknowledge ("ESPOSPUSH_ACK") message. After receiving message 716 acknowledging receipt of the updated location estimate for mobile station 102, the wireless network 100 ends operation according to method 500 at step 514.

Figure 8A:
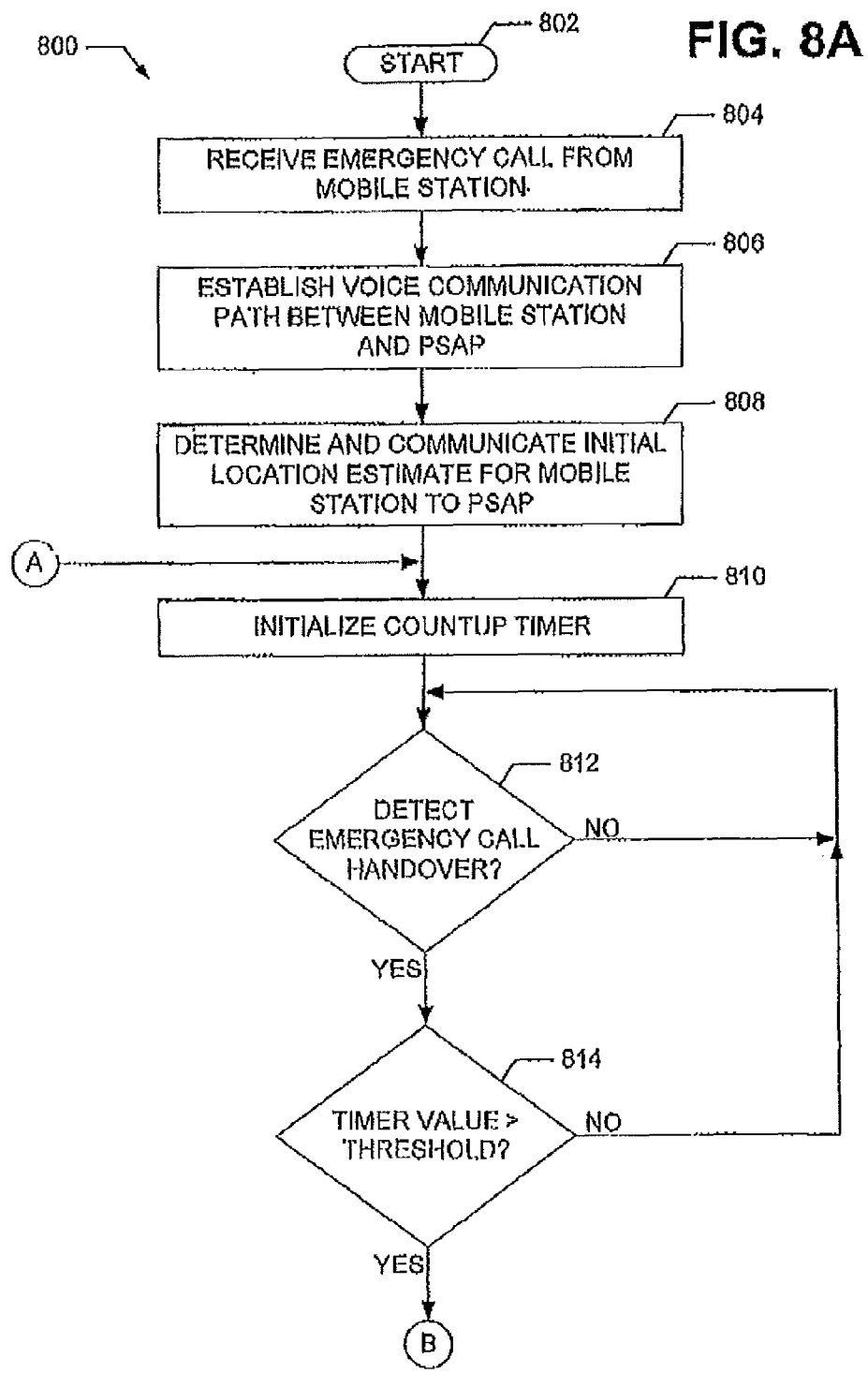

FIGS. 8A-8B display a flowchart representation of a method for handling an emergency call from a mobile station 102 and for automatically providing updated location estimates for the mobile station 102 to a public safety answering point 104 of an emergency services provider during the emergency call in accordance with a second exemplary embodiment of the present invention. When operated according to the method for handling an emergency call from a mobile station 102 and for automatically providing updated location estimates 800 (sometimes referred to herein as "method 800"), the wireless network 100 automatically provides, or pushes, such updated location estimate information to the public safety answering point 104 (via W-ALI 105 and bi-directional data communication links 116, 117) upon the occurrence of a triggering event generated within the wireless network 100 and the satisfaction of certain trigger-related conditions. The triggering event generally comprises the detection of movement of the mobile station 102 and the trigger-related conditions generally relate to whether a minimum period of time has elapsed since the previous pushing of updated location estimate information to the public safety answering point 104 and to whether pushing of the updated location estimate information is enabled for the public safety answering point 104 handling the emergency call. Notably, as in the first exemplary embodiment, the automatic provision or communication of such updated location estimate information is made absent any request from the public safety answering point 104 (or, for that matter, absent any request from outside of the wireless network 100).

After starting at step 802, method 800 advances to step 804 where the wireless network 100 receives a message 600 (see FIG. 6) from a mobile station 102 requesting that the wireless network 100 establish an emergency call between the mobile station 102 and an appropriate public safety answering point 104 in response to a user of the mobile station 102 (i.e., a caller) making an emergency call. Generally, message 600 comprises a connection management service request message (see FIG. 6) that is received by one or more transceiver(s) 114 and communicated, via data communication link 130 and wireless bi-directional data communication channel 138, to a base station controller 110 that provides wireless communication services for the wireless communication cell(s) in which the mobile station 102 is then present. Upon receiving message 600, at step 806, the wireless network 100 establishes a voice communication path 140 between the appropriate public safety answering point 104 and the mobile station 102 in order to enable voice communication between a dispatcher at the public safety answering point 104 and the user of the mobile station 102. Set up of the voice communication path 140 is, according to the exemplary embodiments of the present invention and as described in more detail above with respect to method 300 and FIG. 3, initiated by the base station controller 110 messaging the mobile switching center 108 and subsequently completed by the mobile switching center 108 connecting voice communication links 120, 128, wireless bi-directional voice communication channels 136, and voice communication trunks 124.

Continuing at step 808 of method 800, the wireless network 100 determines and communicates an initial location estimate for the mobile station 102 to the public safety answering point 104 via the W-ALI 105 and data communication links 116, 117. Generally, the initial location estimate is automatically determined by the wireless network 100 after set up of the voice communication path 140 between the mobile station 102 and the public safety answering point 104 and is communicated to the public safety answering point 104 in response to the W-ALI 105 receiving a message from the public safety answering point 104 requesting an initial location estimate for the mobile station 102. Similar to the first exemplary embodiment, the initial location estimate is typically determined through the use of triangulation techniques using data collected from various location measurement units, but may be determined through the use of other data and methods. Also similarly, the initial location estimate comprises data representing the estimated latitude and longitude of the location of the mobile station 102 when the caller made the emergency call. The particular steps associated with the determination and communication of the initial location estimate for the mobile station 102 to the public safety answering point 104 have been more fully described above with respect to method 400 and FIG. 4.

Next, at step 810 of method 800, the wireless network 100 (and, more specifically, the gateway mobile location center 106) initializes a count up timer to zero such that during operation, the timer counts upward toward a pre-determined threshold value described more fully below. After initializing the timer and at step 812, the gateway mobile location center 106 checks to see if a handover of the emergency call to a new cell or sector (i.e., depending on the particular implementation of the present invention) has been detected by other parts of the wireless network 100 due to movement of the mobile station 102 into such new cell or new sector. The detection of such handover (and, hence, movement) constitutes the occurrence of a triggering event that triggers the wireless network's automatic pushing of an updated location estimate for the mobile station 102 to the public safety answering point 104 that is not in response to the receipt of a request for an updated location estimate.

The detection of emergency call handover and mobile station movement is made when the base station controller 110 learns that the emergency call has been handed over to a new cell or new sector, as the case may be. In response to learning of the handover, the base station controller 110 communicates a message 900 (see FIG. 9) to the mobile switching center 108 indicating that the mobile station 102 has moved to a new cell or new sector. According to the second exemplary embodiment, message 900 comprises an emergency call location update message and includes data representative of the mobile station's international ISDN number ("MSISDN"), a mobile switching center identifier ("MSCID") that uniquely identifies the mobile switching center 108 handling the emergency call, and a cell global identifier ("CGI") that uniquely identifies the cell in which the mobile station 102 is then present. Upon receiving message 900, the mobile switching center 108 responds by communicating message 902 (see FIG. 9) to the base station controller 110 to indicate that message 900 has been received. Message 902 typically comprises an emergency call location update acknowledge message. Upon receiving message 902, the mobile switching center 108 also communicates a message 904 (see FIG. 9) to the gateway mobile location center 106 indicating that the mobile station 102 has moved to a new cell or new sector. Responsive to its receipt of message 904, the gateway mobile location center 106 communicates a message 906 (see FIG. 9) to the mobile switching center 108 acknowledging the receipt of message 904. Similar to messages 900, 902 received and sent by the mobile switching center 108, messages 904, 906 generally comprise respective emergency call location update and emergency call location update acknowledge messages.

Continuing in accordance with method 800, if the gateway mobile location center 106 determines that handover of the emergency call and movement of the mobile station 102 into a new cell or new sector has not been detected by the wireless network 100 (e.g., because the gateway mobile location center 106 has not received message 904 from the mobile switching center 108) at step 812, then the gateway mobile location center 106 loops back to step 812 to once again check to see whether such handover of the emergency call and movement of the mobile station 102 has been detected. Alternatively, at step 812, if the gateway mobile location center 106 determines that handover of the emergency call and movement of the mobile station 102 has been detected (e.g., because the gateway mobile location center 106 has received message 904 from the mobile switching center 108), the gateway mobile location center 106 advances to step 814 of method 800 where it ascertains whether the current tinier value is greater than a pre-determined threshold value. Notably, the pre-determined threshold value constitutes a minimum period of time that must transpire between the automatic provision of consecutive updated location estimates for the mobile station 102 to the public safety answering point 104 and is selected to allow the provision of a sufficient number of updated location estimates to the public safety answering point 104 while avoiding the overly frequent provision of updated location estimates to the public safety answering point 104 that might tend to unnecessarily tie up network resources. Such overly frequent provision of updated location estimates might otherwise occur, for instance, if the mobile station 102 is detected moving in and out of cells or sectors along a boundary between cells or sectors during a brief period of time.

If the gateway mobile location center 106 ascertains that the current timer value is less than or equal to the pre-determined threshold value at step 814, it is presumed that the mobile station 102 may, indeed, be moving rapidly in and out of cells or sectors along a boundary between cells or sectors and, hence, that the provision of an updated location estimate to the public safety answering point 104 is not appropriate at the present time because such movement is insubstantial. Therefore, the gateway mobile location center 106 loops back to step 812 to once again check to see whether handover of the emergency call and movement of the mobile station 102 into a new cell or new sector has been detected by the wireless network 100. If, alternatively, the gateway mobile location center 106 ascertains that the current timer value is greater than the pre-determined threshold value at step 814, it is presumed that the mobile station 102 is not moving rapidly in and out of cells or sectors along a boundary between cells or sectors and that the provision of an updated location estimate for the mobile station 102 to the public safety answering point 104 is appropriate and/or warranted because such movement is substantial. Based upon such presumption, operation of the wireless network 100 advances to step 816 of method 800 described below.

At step 816, the gateway mobile location center 106 checks to see whether the automatic provision of updated location estimates to the public safety answering point 104 that are not in response to the receipt of a request for same from the public safety answering point 104 (or, for that matter, from outside of the wireless network 100) has been enabled for the public safety answering point 104. In other words, the gateway mobile location center 106 determines whether the wireless network 100 is to automatically "push" non-requested updated location estimates for the mobile station 102 to the public safety answering point 104 during an emergency call. The gateway mobile location center 106 makes such determination by retrieving enablement data associated with the public safety answering point 106 handling the emergency call from the GMLC's data storage device and evaluating the retrieved enablement data. If, after performing its evaluation, the gateway mobile location center 106 determines that the automatic "pushing" of such non-requested updated location estimates is not enabled for the public safety answering point 104 handling the emergency call, then the gateway mobile location center 106 loops back to step 810 to once again initialize the count up timer to zero. Alternatively, if the gateway mobile location center 106 determines that the automatic "pushing" of such non-requested updated location estimates is enabled for the public safety answering point 104 handling the emergency call, then the gateway mobile location center 106 advances to step 818 of method 800 where it initiates the automatic provision of an updated location estimate for the mobile station 102 to the public safety answering point 104. The wireless network 100 then proceeds to provide such updated location estimate by operating in accordance with method 500 described above with reference to FIG. 5. Once an updated location estimate has been provided, or "pushed", to the public safety answering point 104, operation of the wireless network 100 continues at step 810 where the count up timer is once again initialized to zero. Upon termination of the emergency call, the wireless network 100 ceases operation in accordance with method 800.

It should be noted that the scope of the present invention comprises wireless networks 100 configured such that the same or a different pre-determined threshold value or minimum period of time between the automatic provision of consecutive updated location estimates for the mobile station 102 is used as a trigger-related condition for controlling the automatic determination and communication of mobile station updated location estimates for each different public safety answering point 104 with which the wireless network 100 communicates. It should also be noted that the scope of the present invention comprises wireless networks 100 using hardware and/or software timers, count up and/or countdown timers, and timers that are configured to count between non-zero starting and ending values.

Whereas this invention has been described in detail with particular reference to exemplary embodiments and variations thereof, it is understood that other variations and modifications can be effected within the scope and spirit of the invention, as described herein before and as defined in the appended claims.

The invention claimed is:

1. A system, comprising:
   a processor;
   a computer-readable storage medium comprising computer-executable instructions that, when executed by the processor, cause the processor to perform operations, for processing an emergency call between a wireless communication device and a public safety answering point, comprising:
   detecting whether a triggering event associated with the emergency call has occurred, wherein the triggering event includes handover of the emergency call from a first subdivision of the wireless communication network to a second subdivision of the wireless communication network;
   determining, in response to detecting that the triggering event has occurred, whether a triggering condition associated with the emergency call is satisfied, wherein the triggering condition includes a current value of a previously-initiated count-up timer being greater than a pre-determined threshold value; and
   determining, in response to determining that the triggering condition is satisfied, whether an automatic provision of updated location estimates feature has been enabled for the public safety answering point.

2. The system of claim 1, wherein:
   the operation of determining whether the triggering condition is satisfied is performed in a determination operation; and
   the operations further comprise returning, in response to determining that the triggering condition is not satisfied, to the determining operation.

3. The system of claim 1, wherein:
   the operations further comprise initializing the count-up timer; and
   the operation of detecting whether the triggering event has occurred is performed after initializing the count-up timer.

4. The system of claim 1, wherein the automatic provision of updated location estimates feature, when enabled, provides for provisioning of updated location estimates to the public safety answering point automatically and not in response to a request for updated location estimate.

5. The system of claim 1, wherein the operations further comprise:

initializing a count-up timer in an initializing operation; and returning, in response to determining that the automatic provision of updated location estimates feature has not been enabled for the public safety answering point, to the initializing operation.

6. The system of claim 1, wherein the operations further comprise performing, in response to determining that the automatic provision of updated location estimates feature has been enabled for the public safety answering point, additional operations comprising:
obtaining updated location information for the wireless communication device; and
transmitting the updated location information to the public safety answering point.

7. The system of claim 1, wherein the pre-determined threshold value corresponds to (i) a time period and (ii) whether movement of the wireless communication device is substantial or unsubstantial.

8. The system of claim 1, wherein the pre-determined threshold value corresponds to a time period related to a desired time frequency with which position updates should be provided to the public safety answering point.

9. The system of claim 1, wherein the pre-determined threshold value corresponds to a value distinguishing between:
(I) insubstantial movement of the wireless communication device; and
(II) substantial movement of the wireless communication device.

10. A system, comprising:
a processor; and
a computer-readable storage medium comprising computer-executable instructions that, when executed by the processor, cause the processor to perform operations, for processing an emergency call between a wireless communication device and a public safety answering point, comprising:
detecting, by a component of a wireless communication network, whether a triggering event associated with the emergency call has occurred, wherein the triggering event includes handover of the emergency call from a first subdivision of the wireless communication network to a second subdivision of the wireless communication network; and
determining, in response to detecting that the triggering event has occurred, whether a triggering condition associated with the emergency call is satisfied, wherein the triggering condition includes a current value of a previously-initiated count-up timer being greater than a pre-determined threshold value;
wherein the pre-determined threshold value corresponds to a value distinguishing between:
(I) insubstantial movement of the wireless communication device, wherein the wireless device is presumed to be moving rapidly in and out of subdivisions of the wireless communication network; and
(II) substantial movement of the wireless communication device, wherein the wireless device is presumed to not be moving rapidly in and out of subdivisions of the wireless communication network.

11. The system of claim 10, wherein:
the operation of determining whether the triggering condition is satisfied is performed in a determination operation; and
the operations further comprise returning, in response to determining that the triggering condition is not satisfied, to the determining operation.

12. The system of claim 10, wherein the operations further comprise initializing the count-up timer.

13. The system of claim 12, wherein the operation of detecting whether the triggering event has occurred is performed after initializing the count-up timer.

14. The system of claim 10, wherein the pre-determined threshold value corresponds to a time period related to a desired time frequency with which position updates should be provided to the public safety answering point.

15. The system of claim 10, wherein the operations further comprise determining, in response to determining that the triggering condition is satisfied, whether an automatic provision of updated location estimates feature has been enabled for the public safety answering point.

16. A computer-readable storage device comprising computer-executable instructions that, when executed by a processor, cause the processor to perform operations, for processing an emergency call between a wireless communication device and a public safety answering point, comprising:
detecting, by a component of a wireless communication network, whether a triggering event associated with the emergency call has occurred, wherein the triggering event includes handover of the emergency call from a first subdivision of the wireless communication network to a second subdivision of the wireless communication network; and
determining, in response to detecting that the triggering event has occurred, whether a triggering condition associated with the emergency call is satisfied, wherein the triggering condition includes a current value of a previously-initiated count-up timer being greater than a pre-determined threshold value;
wherein the pre-determined threshold value corresponds to a value distinguishing between:
(I) insubstantial movement of the wireless communication device, wherein the wireless device is presumed to be moving rapidly in and out of subdivisions of the wireless communication network; and
(II) substantial movement of the wireless communication device, wherein the wireless device is presumed to not be moving rapidly in and out of subdivisions of the wireless communication network.

17. The computer-readable storage device of claim 16, wherein:
the operation of determining whether the triggering condition is satisfied is performed in a determination operation; and
the operations further comprise returning, in response to determining that the triggering condition is not satisfied, to the determining operation.

18. The computer-readable storage device of claim 16, wherein:
the operations further comprise initializing the count-up timer; and
the operation of detecting whether the triggering event has occurred is performed after initializing the count-up timer.

19. The computer-readable storage device of claim 16, wherein the pre-determined threshold value corresponds to a time period related to a desired time frequency with which position updates should be provided to the public safety answering point.

20. The computer-readable storage device of claim 16, wherein the operations further comprise determining, in response to determining that the triggering condition is satisfied, whether an automatic provision of updated location estimates feature has been enabled for the public safety answering point.

\* \* \* \* \*